(12) United States Patent
Benet Garcia et al.

(10) Patent No.: US 6,565,922 B2
(45) Date of Patent: May 20, 2003

(54) METHOD OF DECORATING A CERAMIC SUBSTRATE

(75) Inventors: Carlos Benet Garcia, Castellon de la Plana (ES); Javier Garcia Sainz, Castellon de la Plana (ES); Juan Carlos Gallart, Valencia (ES)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 10/246,291

(22) Filed: Sep. 18, 2002

(65) Prior Publication Data

US 2003/0039756 A1 Feb. 27, 2003

Related U.S. Application Data

(62) Division of application No. 09/676,252, filed on Sep. 29, 2000, now Pat. No. 6,464,765.

(51) Int. Cl.[7] .............................. B05D 5/06; B05D 3/02; B05D 3/10; B05D 1/02; B05D 3/12
(52) U.S. Cl. .................... 427/287; 427/282; 427/376.1; 427/337; 427/343; 427/240; 427/421; 428/542.2
(58) Field of Search ................................. 427/256, 282, 427/287, 376.1, 337, 343, 240, 421; 428/542.2

(56) References Cited

U.S. PATENT DOCUMENTS

| | | | |
|---|---|---|---|
| 5,273,575 A | * | 12/1993 | de Saint Romain ...... 106/31.05 |
| 6,042,884 A | | 3/2000 | Klein et al. |
| 6,045,859 A | | 4/2000 | Klein et al. |
| 6,071,332 A | | 6/2000 | Schulz et al. |
| 6,464,765 B1 | * | 10/2002 | Garcia et al. ............. 106/31.05 |

FOREIGN PATENT DOCUMENTS

| | | |
|---|---|---|
| EP | 0704411 | 1/1998 |
| EP | 0909748 | 4/1999 |
| EP | 0927710 | 7/1999 |
| EP | 0940379 | 9/1999 |
| EP | 0960872 | 12/1999 |
| WO | WO 97/38952 | 10/1997 |
| WO | WO 98/31647 | 7/1998 |
| WO | WO 00/10941 | 3/2000 |
| WO | WO 00/15579 | 3/2000 |

* cited by examiner

*Primary Examiner*—Michael Barr
(74) *Attorney, Agent, or Firm*—Rankin, Hill, Porter & Clark LLP

(57) ABSTRACT

The present invention provides a method of decorating a ceramic substrate. The method according to the invention includes applying a slurry that includes solid particles of at least one color-contributing metal salt dispersed in a saturated solution of at least one color-contributing metal salt having a viscosity of from about 10 to about 20,000 centipoise to a ceramic substrate, applying a solvent to the ceramic substrate in amount sufficient to at least partially dissolve the solid particles, and firing the ceramic substrate. Preferably, the solid particles in the slurry have a diameter of less than about 40 microns. The present invention also provides a porcelain tile decorated in with the method.

19 Claims, No Drawings

METHOD OF DECORATING A CERAMIC SUBSTRATE

This is a division of application Ser. No. 09/676,252, filed Sep. 29, 2000 now U.S. Pat. No. 6,464,765.

FIELD OF INVENTION

The present invention provides a slurry for use in decorating a ceramic substrate and a method of decorating a ceramic substrate using the slurry.

BACKGROUND OF THE INVENTION

It is known that solutions of metal salts can be used to decorate ceramic substrates. These solutions of metal salts can be applied using a variety of known application techniques including flat or rotative printing, flexogravure, rotogravure, tampography, spraying, and various disk techniques. The ceramic substrates are then fired to drive off any volatile components and permanently fix the decoration to the ceramic substrate.

One of the problems with using solutions of metal salts to decorate ceramic substrates is that the resulting coloration tends not to be particularly intense. The lack of intense color is particularly noticeable when the metal salt solutions are applied by rotogravure processes, such as, for example, ROTOCOLOR by System S.p.A. The intensity of the coloration obtained after firing depends, in large part, upon the particular metal used and the concentration of the metal dissolved in the solvent. The maximum concentration of metal in solution is generally limited by the solubility of the metal salt in the solvent being used. Other considerations include the compatibility of the various different types of metal salts that are sometimes blended to obtain various colors. Yet another consideration is the viscosity of the solution, which must be kept within particular ranges in order to be applied by known decoration techniques.

SUMMARY OF INVENTION

The present invention provides a slurry for use in decorating a ceramic substrate. The slurry according to the invention comprises solid particles of at least one color-contributing metal salt dispersed in a saturated solution of at least one color-contributing metal salt. Preferably, the solid particles have a diameter of less than about 40 microns, and the slurry itself has a viscosity of from about 10 to about 20,000 centipoise. This makes the slurry particularly suitable for application to a ceramic substrate using known application processes such as, for example, rotogravure and tampography.

The present invention also provides a method of decorating a ceramic substrate. The method according to the invention comprises applying a slurry that comprises solid particles of at least one color-contributing metal salt dispersed in a saturated solution of at least one color-contributing metal salt having a viscosity of from about 10 to about 20,000 centipoise to the surface of a ceramic substrate, applying a solvent to the surface of the ceramic article in amount sufficient to at least partially dissolve the solid particles, and firing the ceramic article.

The slurry and method according to the present invention allow for the application of higher concentrations of color-contributing metals to the ceramic substrate than can be applied using metal salt solutions. The resulting coloration that can be obtained on a ceramic substrate using the slurry and method according to the present invention is therefore substantially more intense than the coloration that can be obtained using a solution of a metal salt. Moreover, a higher definition can be achieved in decorative designs, and the decorations tend to be more consistent.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The present invention provides a slurry for use in decorating a ceramic substrate. The slurry comprises solid particles of at least one color-contributing metal salt dispersed in a saturated solution of at least one color-contributing metal salt. Throughout the instant specification and in the appended claims, the term "color-contributing metal" means a metal that contributes to the development of color when applied to a ceramic substrate and fired. It will be appreciated that a metal that does not produce or generate a color when applied to a ceramic substrate by itself may nevertheless be considered a "color-contributing metal" if the metal influences the color produced or generated by another metal. Metals that are considered to be "color-contributing metals" include, but are not limited to, transition metals (e.g., Sc, Ti, V, Cr, Mn, Fe, Co, Ni, Cu, Y, Zr, Nb, Mo, Ru, Rh, Pd, Ag, La, Hf, Ta, W, Re, Os, Ir, Pt, and Au), alkaline earth metals (e.g., Ca, Mg, Ba, and Sr), alkali metals (e.g., Li, Na, K, Rb, and Cs), metals from the lanthanide series (e.g., Ce, Pr, Nd, Sm, Eu, Gd, Tb, Dy, Ho, Er, Tm, Yb, and Lu), and "post transition" (filled d shell) metals (e.g., Zn, Cd, Al, Si, In, Sn, Pb, Sb, and Bi).

The particle size of the solid color-contributing metal salts used in the slurry must be sufficiently small to accommodate the conditions encountered during application. For example, if the slurry is to be applied by screen printing, the solid particles must be small enough to easily pass through a screen. Likewise, if the slurry is to be applied by rotogravure, the solid particles must be small enough to easily fill the holes of the rotogravure equipment being used. Preferably, the solid particles have a diameter of less than about 40 microns. Various known techniques such as milling and/or grinding can be used to obtain solid particles having the desired diameter.

The solid particles of color-contributing metal salts used in the slurry must be at least partially soluble in a solvent, preferably water. Suitable color-contributing metal salts include, but are not limited to, carboxylates, such as acetates, formates, ascorbates, citrates, propionates, lactates, tartrates, glycolates, and maleates, other organic salts such as substituted carboxylates (e.g., aminic or hydroxyl), salts of glycine and urea, thiocyanates, and various metal complexes. In addition, inorganic salts such as halides, nitrates, nitrites, sulfates, sulfites, and phosphates can be used.

As noted, the preferred solvent for use in forming the saturated solution is water. However, other solvents such as alcohols can be used. Furthermore, co-solvents such as water and alcohols can also be used. Solvent selection will depend in large part upon the solubility of the color-contributing metal salts to be used, the application method being used, cost, and environmental and/or processing concerns.

The saturated solution of at least one color-contributing metal salt into which the solid particles are dispersed preferably comprises a saturated solution of the same color-contributing metal salt as the solid particles. For example, if the solid particles used in the slurry comprise cobalt acetate, then preferably the saturated solution comprises a saturated solution of cobalt acetate. However, it will be appreciated that compatible blends of solid particles of different color-contributing metal salts and compatible blends of different saturated solutions of color-contributing metal salts may be used in some circumstances in order to obtain the desired coloration.

The amount of solids used in the slurry will depend, in large part, upon the desired intensity of the coloration in the final ceramic article. Typically, the slurry will comprise from about 50 to about 90 parts by weight of solid particles and from about 20 to about 50 parts by weight of the saturated solution.

Preferably, the viscosity of the slurry is from about 10 to about 20,000 centipoise, which makes the slurry suitable for application using known processes and equipment. It will be appreciated that the viscosity of the slurry can be affected by a number of factors. For example, it is known that viscosity can be affected by the degree of intermolecular bonding, such as hydrogen bonding, that occurs in solution. Viscosity can also be affected by the choice of solvent or co-solvents used to form the saturated solution. For example, the addition of lower alcohols such as methanol generally reduces the viscosity of an aqueous saturated solution whereas the addition of polyethylene glycol generally increases the viscosity of an aqueous saturated solution. Viscosity can also be affected by the solubility of the color-contributing metal salt or salts used in the slurry, which can change depending upon factors such as pH, temperature, and the presence of other additives/agents in the slurry.

Preferably, the slurry according to the invention further comprises one or more additives/agents such as, for example, rheology/viscosity modifiers and thixotropic agents. Rheology/viscosity modifiers can be used to assist in adjusting the slurry to the proper viscosity for the particular application technique being used. For rotogravure processes, such as ROTOCOLOR by System S.p.A., the viscosity of the slurry is preferably adjusted to from about 10 to about 5,000 centipoise. For screen printing techniques, the viscosity of the slurry is preferably adjusted to from about 1,000 to about 10,000 centipoise. Rheology/viscosity modifiers can also be used to insure that the slurry exhibits the desired psuedoplastic behavior. Thixotropic agents can be used to prevent sedimentation of the solids. Suitable additives/agents for use in the slurry according to the invention include, for example, bentonites, modified bentonites, sepiolites, amorphous silica, clays, and the like.

The slurry can also further comprise one or more humectants. Humectants can be used to assist in preventing the slurry from undesirable drying during application or storage. Suitable humectants for use in the invention include, for example, ethylene glycol, polyethylene glycol, and glycerin. It will be appreciated that some materials that are used as rheology/viscosity modifiers may also function as humectants, and vice versa. Preferably, the slurry comprises up to about 15 parts by weight of such additives/agents. In a preferred embodiment of the invention, the slurry comprises from about 1 to about 5 parts by weight modified betonite, from about 1 to about 3 parts by weight amorphous silica, and from about 2 to about 7 parts by weight polyethylene glycol 200.

In one embodiment of the invention, the ceramic substrate is enriched with additives such as $TiO_2$, $ZrO_2$, $Al_2O_3$, $CaSnO_3$, $SnO_2$, and $ZrSiO_4$, to further enhance the development of color: For example, the addition of $TiO_2$ to a ceramic body will intensify and enhance the color produced from a slurry containing antimony and chromium salts.

The present invention also provides a method of decorating a ceramic substrate. The method comprises applying a slurry according to the invention to the surface of a ceramic substrate; applying a solvent to the surface of the ceramic substrate in amount sufficient to at least partially dissolve the solid particles; and firing the ceramic substrate. The slurry can be applied to the surface of the ceramic substrate by any of the known conventional application techniques including, for example, flat screen printing, rotative screen printing, flexogravure, rotogravure, tampography, spraying, or any of the various disk techniques.

As noted above, after the slurry has been applied to the surface of the ceramic substrate, a solvent is applied to at least partially dissolve the solid particles. The solvent can be applied using any of a number of techniques, such as dipping and condensing, but spraying is preferred. The solvent used must be capable of dissolving, at least partially, the solid particles in the slurry, which penetrate into the surface of the ceramic substrate to a depth of up to about 2 mm. To assist in dissolving the solid particles, the temperature of the solvent is preferably from about 30° C. to about 90° C.

Water is the preferred solvent for use in dissolving the solid particles of color-contributing metal salts. However, it has been found that the addition of salts to the water, such as sodium citrate and/or sodium chloride, results in a decoration having a higher definition than if water alone is used. A variety of salts, both inorganic and organic, can be used. Sodium citrate and sodium chloride are particularly preferred due to their relatively low cost and minimal environmental risk.

As noted above, after the solvent is applied to at least partially dissolve the solid particles in the slurry, the ceramic substrate is fired to form and fix the decoration thereon. Firing is preferably conducted at a temperature greater than 300° C., and more preferably from about 500° C. to about 1,300° C. It will be appreciated that firing times and temperatures will depend, in large part, upon the nature of the ceramic article being decorated, the color desired, and the particular color-contributing metal salts being used.

Although the slurry can be applied to glazed ceramic substrates, it is preferably applied to unglazed ceramic substrates that are either green or once-fired. If the ceramic substrate is green, the slurry is applied to the ceramic substrate, a solvent is applied to at least partially dissolve the solid particles in the slurry, and then the ceramic substrate is typically fired at a temperature of from about 1,000° C. to about 1,300° C. If the ceramic substrate has been once-fired, typically at about 600° C. to about 800° C., the slurry. is applied to the surface of the once-fired substrate, a solvent is applied to at least partially dissolve the solid particles in the slurry, and then the ceramic substrate is typically fired at a temperature of about 1,000°0 C. to about 1,200° C.

Applicants have discovered that the intensity of the color produced using the slurry appears to be higher when the ceramic substrate has been once-fired prior to application of the slurry. In such circumstance, the ceramic substrate is at least partially vitrified, which reduces the extent to which the dissolved color-contributing metal salts can migrate and/or penetrate into the body of the ceramic substrate. This results in a higher concentration of the color-contributing metal salt remaining at or just below the surface of the ceramic substrate.

The present invention is particularly suitable for use in the production of porcelain tile. A wide range of colors of various intensities can be produced using the slurry and method according to the invention, particularly shades of brown, gray, blue, and other aesthetically pleasing "earthy" colors. Porcelain tile can be colored using the slurry and used in an "as-is" condition after firing. Moreover, because the color-contributing metal salts penetrate into the body of the ceramic substrate a certain depth, the surface of the tile can be polished after firing by known grinding techniques to produce an intensely colored glossy tile. It is also possible to apply a glaze composition to the ceramic substrate after the slurry and solvent have been applied and then fire the glaze and applied slurry at the same time.

Another aspect of the invention is the use of a precipitating agent that can be used in combination with the color-contributing metal salt slurries described above in order to obtain special decorative effects such as in "Bordino", which reproduces a decoration using ceramic that simulates natural marble. The precipitating agent can be included in the slurry or introduced to the surface of the ceramic substrate as a separate solution. For example, sodium carbonate, sodium oxalate, sodium hydroxide, ammonia, and/or sodium phosphate can be used to precipitate a color-contributing metal carbonates, oxalates, hydroxides, and/or phosphates, and to concentrate the color-contributing metal in areas where the precipitating agent and the color-contributing metal are present together.

Prior to the present invention, the only way high intensity color could be obtained on ceramic substrates using solutions of metal salts was if the metal salts were sprayed on. The technique of spraying solutions of metal salts is not advantageous, because it is difficult to obtain high definition in the decoration, and also because it releases solublized metals into the atmosphere. Some metal and/or their salts can present health hazards, and some such as antimony salts, are known to be toxic. By using slurries according to the present invention, it is possible to achieve the desired high intensity coloration using non-spraying techniques. No aerosols are created, and the environmental and hazards are significantly lower. The slurries according to the present invention can be used to decorate a variety of ceramic articles, including porcelain tile and dinnerware.

The following examples are intended only to illustrate the invention and should not be construed as imposing limitations upon the claims.

EXAMPLE I

Slurries A, B, C, D, E, F, and G according to the invention were prepared by blending the components in the amounts specified in parts by weight in Table I below:

TABLE I

| Component | Slurry A | Slurry B | Slurry C | Slurry D | Slurry E | Slurry F | Slurry G |
| --- | --- | --- | --- | --- | --- | --- | --- |
| Solid Cobalt Acetate | 70 | — | — | — | — | — | — |
| Solid Nickel Acetate | — | 70 | — | — | — | — | — |
| Solid Chromium Acetate | — | — | 70 | — | — | — | — |
| Solid Vanadium Acetate | — | — | — | 70 | — | — | — |
| Solid Ferric Acetate | — | — | — | — | 70 | — | — |
| Solid Potassium Antimony Tartrate | — | — | — | — | — | 75 | — |
| Solid Ammonium Metatungstate | — | — | — | — | — | — | 68 |
| Ammonia (30% w. aqueous) | — | — | — | — | — | 5 | — |
| Saturated Solution of Same Metal as Solid in Water | 35 | 35 | 35 | 35 | 35 | 20 | 30 |
| Modified Bentonite | 2 | 2 | 2 | 2 | 2 | 2 | 6 |
| Amorphous Silica | 1 | 1 | 1 | 1 | 1 | 1 | — |
| Polyethylene Gylcol 200 | 5 | 5 | 5 | 5 | 5 | 5 | 5 |

The slurries were formed by mixing the modified bentonite, which was purchased as OPTIGEL CF from Comindex S.A., and the amorphous silica, which was purchased as CAB-O-SIL, grade M-5, from Cabot, in the saturated solution of the color-contributing metal in a ball mill. The solid particles of the color-contributing metal salt were then added and the mixture was milled until the solids had an average particle diameter of about 30 microns. Polyethylene glycol 200 was added to the slurry after milling.

EXAMPLE II

Some of the slurries prepared in Example I were intermixed in the amounts as specified in parts by weight in Table II, and then applied to green porcelain tiles using ROTO-COLOR equipment. The porcelain tiles were then fired for about 12 minutes at about 1,250° C. in an oven. The results are shown in Table II below:

TABLE II

| Sample # | Slurry/Amount | Slurry/Amount | Resultant Color |
| --- | --- | --- | --- |
| 1 | Slurry A/10 parts | Slurry D/90 parts | Neutral Grey |
| 2 | Slurry E/50 parts | Slurry C/50 parts | Reddish Brown |
| 3 | Slurry A/50 parts | Slurry B/50 parts | Brown-Grey |
| 4 | Slurry A/50 parts | Slurry C/50 parts | Blue-Green |

Additional advantages and modifications will readily occur to those skilled in the art. Therefore, the invention in its broader aspects is not limited to the specific details and illustrative examples shown and described herein.

Accordingly, various modifications may be made without departing from the spirit or scope of the general inventive concept as defined by the appended claims and their equivalents.

What is claimed is:

1. A method of decorating a ceramic substrate comprising:
applying a slurry having a viscosity of from about 10 to about 20,000 centipoise to said ceramic substrate, said slurry comprising solid particles of at least one color-contributing metal salt dispersed in a saturated solution of at least one color-contributing metal salt;
applying a solvent to said ceramic substrate in amount sufficient to at least partially dissolve said solid particles; and
firing said ceramic substrate.

2. The method according to claim 1 wherein said slurry is applied to said ceramic substrate by flat screen printing, rotative screen printing, flexogravure, rotogravure, tampography, spraying, or using a disk technique.

3. The method according to claim 1 wherein said solvent is applied to said ceramic substrate by spraying.

4. The method according to claim 1 wherein said solvent comprises water.

5. The method according to claim 1 wherein said solvent further comprises a salt.

6. The method according to claim 5 wherein said salt is selected from the group consisting of sodium chloride and sodium citrate.

7. The method according to claim 1 wherein said solid particles have a diameter of less than about 40 microns.

8. The method according to claim 1 wherein said slurry further comprises one or more additives selected from the group consisting of rheology/viscosity modifiers, thixotropic agents, and humectants.

9. The method according to claim 1 wherein said ceramic substrate comprises a porcelain tile.

10. The method according to claim 1 wherein said ceramic substrate has been enriched with one or more selected from the group consisting of $TiO_2$, $ZrO_2$, $Al_2O_3$, $SnO_2$, $CaSnO_3$, and $ZrSiO_4$.

11. The method according to claim 1 wherein said solid particles are at least partially soluble in the solvent.

12. The method according to claim 1 wherein said solid particles comprise a water soluble color-contributing metal salt comprising one or more selected from the group consisting of carboxylates, substituted carboxylates, halides, nitrates, nitrites, sulfates, sulfites, and phosphates.

13. The method according to claim 12 wherein said carboxylates comprise one or more selected from the group consisting of acetates, formates, ascorbates, citrates, propionates, lactates, tartrates, glycolates, and maleates.

14. The method according to claim 1 wherein said slurry comprises from about 50 to about 90 parts by weight of the solid particles and from about 20 to about 50 parts by weight of the saturated solution.

15. The method according to claim 8 wherein said additives comprise one or more selected from the group consisting of bentonites, modified bentonites, sepiolites, amorphous silica, clays, ethylene glycol, polyethylene glycol, and glycerin.

16. The method according to claim 8 wherein said slurry comprises up to about 15 parts by weight of said additives.

17. The method according to claim 14 wherein said slurry further comprises from about 1 to about 5 parts by weight modified bentonite, from about 1 to about 3 parts by weight amorphous silica, and from about 2 to about 7 parts by weight polyethylene glycol 200.

18. The method according to claim 1 wherein said solid particles comprise a water soluble color-contributing metal carboxylate selected from the group consisting of acetates and tartrates.

19. A porcelain tile decorated in accordance with the method of claim 1.

* * * * *